Jan. 7, 1930.  J. A. FALLMAN ET AL  1,742,988
QUACK GRASS AND WEED DESTROYER
Filed Feb. 8, 1929  3 Sheets-Sheet 1
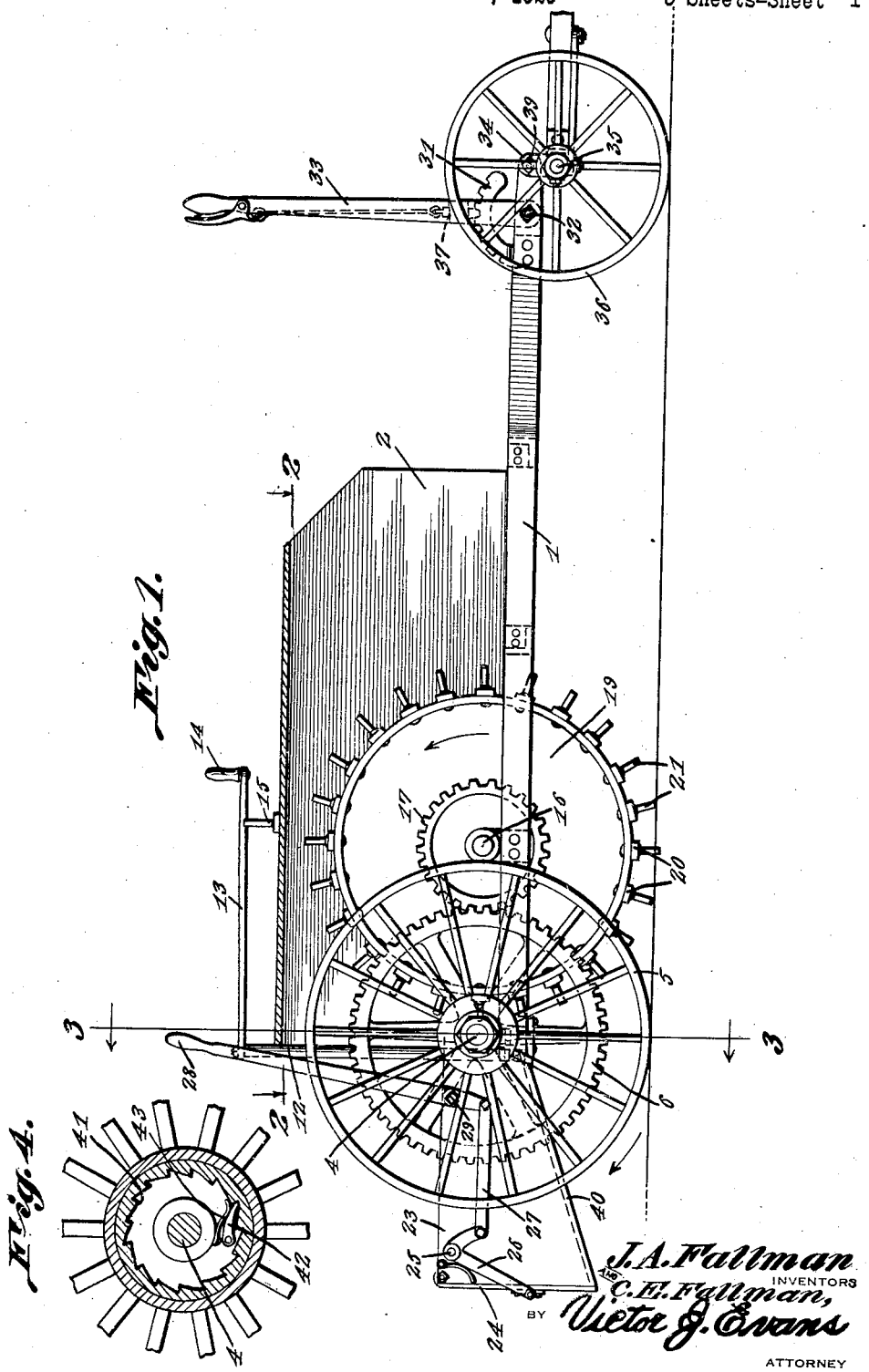

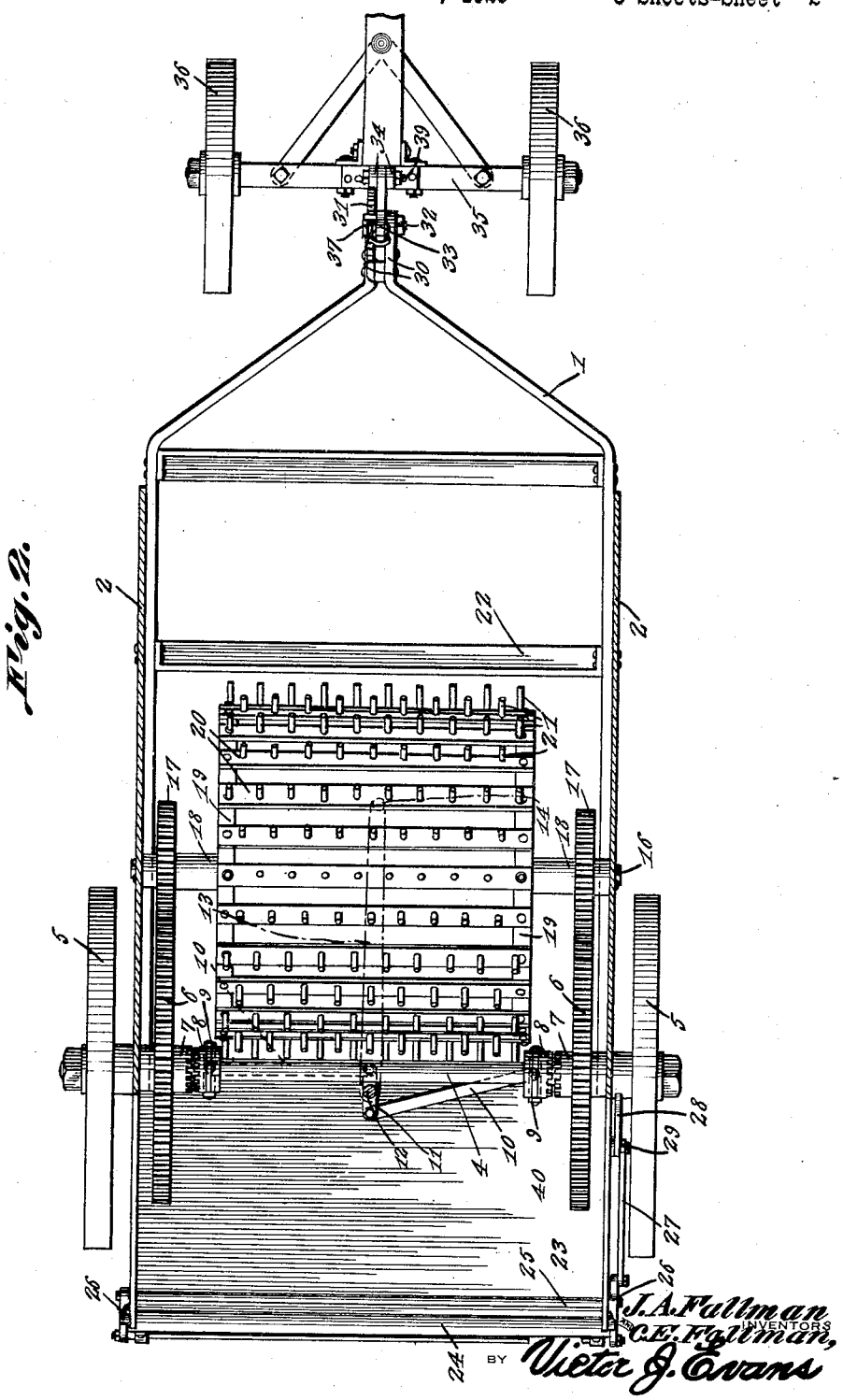

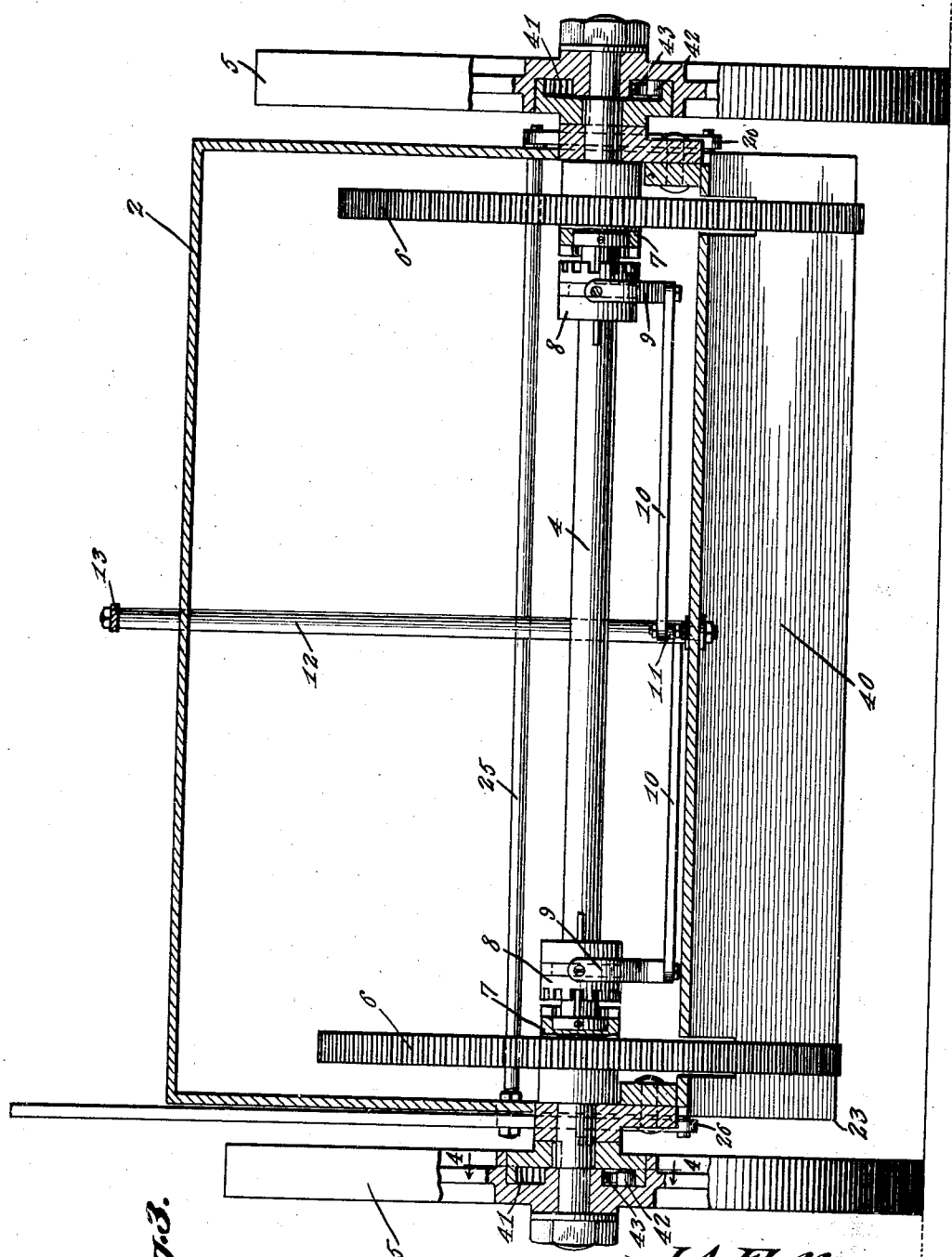

Patented Jan. 7, 1930

1,742,988

UNITED STATES PATENT OFFICE

JOHN A. FALLMAN AND CLARENCE E. FALLMAN, OF YORK, NORTH DAKOTA

QUACK-GRASS AND WEED DESTROYER

Application filed February 8, 1929. Serial No. 338,541.

The present invention has reference to a weed exterminator and is particularly designed for employment in destroying quack grass.

An object of the invention is the provision of a weed exterminator that is mounted on wheels and which carries a digging drum, together with means for forcing the teeth of the drum into the ground, means in the nature of a breaker bar in close proximity to the teeth of the drum for removing soil from the drum, the teeth of the drum being so arranged that the earth will fall therebetween, that the weeds and other growth will be projected into a suitable delivery trough at the rear of the device, which latter is normally closed by a door.

A still further object is the provision of a device for this purpose in which the digging drum may be raised or lowered with respect to the ground surface or elevated above the ground surface when the digging drum is not required for use, together with means for clutching or declutching the digger drum with respect to the rear or propelling shaft of the vehicle and many other details of construction which will be hereinafter described, illustrated by the accompanying drawings and set forth in the appended claims.

In the drawings:

Figure 1 is a side elevation a section line 2—2 of the improvement with parts of the hood or housing in section.

Figure 2 is a sectional view on the line 2—2 of Figure 1.

Figure 3 is a transverse sectional view on the line 3—3 of Figure 1.

Figure 4 is a detail sectional view approximately on the line 4—4 of Figure 3.

On a substantially U-shaped frame 1 I mount a shield or housing 2. The shield or housing is proferably of metal and is of sufficient strength to support the driver of the vehicle (now to be described).

The side bars of the frame 1, adjacent to the rear thereof have journaled therethrough the rear axle 4 of the improvement. This axle has fixed on its outer ends traction wheels 5. Freely arranged on the axle but held from longitudinal movement thereon and adjacent to the inner sides of the shield 2 there are arranged comparatively large toothed wheels 6, each of which having its hub provided with a clutch surface 7. Splined for longitudinal movement on the axle 2 there are clutch members 8 to coengage with the clutch surfaces 7 on the hubs of the toothed wheels 6. These clutch members 8 have their bodies round and provided with annular grooves for the reception of forks 9 whose ends are formed with inwardly directed rollers or studs, and the center of each of the forks has pivotally secured thereto a link 10 that has its free end inwardly directed and pivotally connected to the ends of a link 11. The link 11 may, as disclosed by the drawings be in the nature of two spaced arms, which are disposed on the opposite sides of a vertically extending shaft 12 that is journaled in suitable bearings in the lower portion of the device and likewise journaled through a bearing opening in the top of the shield 2. The upper end of the lever has fixed thereon an operating rod 13 which extends over the flat top of the shield 2. The outer end of this rod is provided with an upstanding handle 14 and the rod 13 is arranged for movement in an upstanding rack plate 15.

By this arrangement it will be noted that the toothed wheel 6 may be clutched on or unclutched from the shaft.

Journaled in suitable bearings in the sides of the shield 2, forward of the shaft 4, there is a second shaft 16 that carries toothed wheels 17 that mesh with the toothed wheels 6. The toothed wheels 17 are smaller than the toothed wheels 6. In lieu of the shaft 16 there may be fixed on the sides of the casing an axle around which is journaled tubular short shafts 18 that are secured to the closed sides or discs 19 of the digger drum. There is fixed on the periphery of the sides 19 spaced bars 20, each of which is provided with a plurality of spaced digger teeth 21. By reference to Figure 2 of the drawings it will be seen that the digger teeth 21 on one of the bars are arranged centrally with respect to the teeth on the adjacent bars so that all of the ground surface will be engaged by the teeth.

Forward of the digger drum there is fixed between the side members of the frame 1 an angle cross bar 22 which is in the nature of a breaker bar inasmuch as the same is arranged in close proximity to the teeth of the digger drum and will break therefrom any accumulation of earth carried by the said teeth.

Directly below the axle 4 and suitably supported by the frame 1 and the shield 2, there is a dirt receiving receptacle or trough 23. The member 23 has its sides and bottom closed and its ends open. The outer end of the receptacle 23 is normally closed by a hinged door 24. Passing through the sides of the receptacle 23, adjacent to the top and also adjacent to the outer corner thereof there is a pivot bolt or rod 25 for bell crank levers 26. The outer arms of these bell crank levers are loosely and pivotally connected to the door 24 and the inner end of one of the bell crank levers is secured to a link 27 which in turn is pivotally connected to an operating lever 28. The lever is pivoted to one side of the receptacle 23, as indicated by the numeral 29. The handle end of the lever 28 and the handle 14 of the shaft operating member 13 are both in close proximity to the driver who occupies the front of the shield so that the clutches may be moved to clutching or unclutching position and the door of the receptacle 23 may be opened and closed in an easy and convenient manner.

The substantially U-shaped frame 1 has its forward or connected end formed with spaced parallel extensions 30 between which there is fixed an upwardly extending arched rack 31. Also pivoted between these ends 30 of the frame, as indicated for distinction by the numeral 32, there is the end of an angle lever 33. The lower end of the lever is compartively short and is pivoted between a pair of upstanding lugs 34 on the axle 35 for the front wheels 36. The lever 33 carries a spring influenced handle operated pawl or dog 37 to engage with the teeth of the arched rack 31. By this arrangement it will be noted that the frame 1 and consequently the digger drum may be swung upon the axle 4 and upon the pivot 39 between the ears and the end of the short arm of the lever 33, so that the teeth of the drum may be forced into the ground at desired depths or the said drum may be elevated above the ground surface as when the vehicle is traveling without operating the drum. The bottom of the receptacle 23 is arranged at a downward angle, as indicated by the numeral 40 so that the quack grass or other weeds received therein will gravitate therefrom when the door is opened. The bell crank or link connection between the door and receptacle serves as an effective means for holding the door closed.

By reference to Figure 4 of the drawings it will be seen that the hubs of the rear or drive wheels of the device have inner toothed surfaces and that the rear axle carries discs to which are pivoted dogs 42 that engage with the said teeth, the said dogs being influenced to such engagement by springs 43. By this arrangement both of the wheels are caused to turn in a forward direction at the same speed and also by this arrangement one of the wheels may idle when the vehicle is turning corners.

The construction and advantages will, it is thought, be understood and appreciated by those skilled in the art to which such invention relates so that further detailed description will not be required. Obviously we do not wish to be restricted to the precise details herein set forth and, therefore hold ourselves entitled to make such changes therefrom as fairly fall within the scope of what we claim.

Having described the invention, we claim:

1. In a device for the purpose set forth, an open frame journaled on rear wheels, and supported by front wheels, lever operated means for canting the frame on the wheels, a toothed digger drum journaled transversely between the sides of the frame, a cross bar on the frame in close proximity to the forward teeth of the digger drum, means for turning the drum upon the rotation of the rear wheels of the frame, clutch means for locking the drum to the wheels or releasing the said drum from engagement with the wheels, a receptacle below the rear of the drum and supported by the frame having an inclined bottom and a hinged closure for the outer end thereof, and lever operated means for swinging the closure to open position.

2. In a device for the purpose set forth, a substantially U-shaped frame, a rear axle journaled through the frame and carrying wheels on the ends thereof, toothed wheels freely mounted on the frame and held from longitudinal movement thereon and having their inner hubs provided with clutch surfaces, clutch members splined for movement on the axle to engage with the first mentioned clutch surfaces, links associated with the last mentioned clutch members, a lever to which the links are connected, a second shaft journaled transversely of the frame, a digger wheel having its ends fixed on said shaft, and each of which ends comprising a disc, toothed carrying plates fixed on the periphery of the disc, a transverse bar supported in the frame directly forward of the digger drum, a shield above the digger drum, a weed receiving receptacle supported at the rear of the shield and frame and having its bottom inclined downwardly and disposed below the wheel carrying axle and below the rear of the digger drum, a door hingedly secured to the rear of the receptacle for closing the same, a shaft journaled transversely through the receptacle and having bell crank levers, one of whose arms is pivotally secured to the door, a link pivotally secured to the second arm of the bell crank lever, an operating lever pivoted to the side of the receptacle and to the link and having its handle portion disposed above the shield, an upstanding rod having a handle end pivotally secured to the upstanding shaft, a rack for engaging the rod, and wheels supporting the forward end of the frame.

3. In a machine for the purpose set forth, comprising a substantially U-shaped frame, a rear axle journaled transversely therethrough and carrying wheels on the ends thereof, an upstanding shield supported by the frame, toothed wheels freely journaled on the axle having clutch surfaces, slidable clutch members splined on the axle for engaging said clutch surfaces, yokes freely associated with the slidable clutch members, links pivotally secured to the yokes, an upstanding shaft having lugs to which the links are pivoted, a handle operated bar for the shaft disposed over the top of the shield, a rack on the shield on which the bar is received, a second shaft journaled between the sides of the frame, a digger wheel having its sides fixed to the shaft, and its said sides comprising discs, spaced tooth carrying bars connected with the discs, a breaker bar on the frame arranged adjacent to the forward teeth of the digger drum, a receptacle supported to the rear of the digger drum and extending beyond the shield and having an inclined bottom, a hinged door for normally closing the outer end of the receptacle, a bell crank lever pivoted to the side of the receptacle and to the door, a link pivoted to the free arm of the bell crank lever, an operating lever pivoted to the side of the receptacle and likewise pivoted to the link and having a handle end disposed above the top of the receptacle, said frame having its forward end provided with closely related parallel extensions, an upstanding arched toothed rack having one end secured between said extensions, a lever pivoted between said extensions and carrying a hand operated pawl to engage with a rack, said lever having a lower angle extension, a front wheel carrying axle having lugs to which the angle end of the lever is pivoted.

In testimony whereof we affix our signatures.

CLARENCE E. FALLMAN.
JOHN A. FALLMAN.